(12) United States Patent
Lohr et al.

(10) Patent No.: US 8,141,428 B2
(45) Date of Patent: Mar. 27, 2012

(54) HIGH PRESSURE SENSOR

(75) Inventors: Raymond David Lohr, Long Crendon (GB); Victor Alexandrovich Kallnin, Headington (GB)

(73) Assignee: Transense Technologies PLC, Bicester, Oxon (GB)

( * ) Notice: Subject to any disclaimer, the term of this patent is extended or adjusted under 35 U.S.C. 154(b) by 899 days.

(21) Appl. No.: 12/134,365

(22) Filed: Jun. 6, 2008

(65) Prior Publication Data

US 2008/0289431 A1 Nov. 27, 2008

(30) Foreign Application Priority Data

Apr. 23, 2008 (GB) .................................. 0807405.6

(51) Int. Cl.
*G01L 11/06* (2006.01)

(52) U.S. Cl. ........................................................ 73/703

(58) Field of Classification Search .................... 73/703, 73/708, 715
See application file for complete search history.

(56) References Cited

U.S. PATENT DOCUMENTS

| | | | | |
|---|---|---|---|---|
| 4,512,198 A * | 4/1985 | Sinha et al. | ..................... | 73/703 |
| 4,534,223 A * | 8/1985 | Sinha et al. | ..................... | 73/703 |
| 4,535,631 A * | 8/1985 | Sinha et al. | ..................... | 73/703 |
| 4,535,632 A * | 8/1985 | Sinha et al. | ..................... | 73/703 |
| 4,586,382 A * | 5/1986 | Sinha | ............................. | 73/703 |
| 6,907,787 B2 * | 6/2005 | Cook et al. | ..................... | 73/700 |
| 7,036,383 B2 * | 5/2006 | Imai et al. | ....................... | 73/754 |
| 7,065,459 B2 * | 6/2006 | Kalinin et al. | .................. | 702/77 |
| 7,089,794 B2 * | 8/2006 | Kalinin et al. | .................. | 73/579 |
| 7,151,337 B2 * | 12/2006 | Kalinin et al. | ............ | 310/313 R |
| 7,918,134 B2 * | 4/2011 | Hedtke et al. | ................... | 73/718 |
| 2004/0216526 A1 * | 11/2004 | Cook et al. | ..................... | 73/708 |
| 2005/0103111 A1 * | 5/2005 | Imai et al. | ........................ | 73/715 |

* cited by examiner

*Primary Examiner* — Freddie Kirkland, III
(74) *Attorney, Agent, or Firm* — Keusey & Associates, P.C.

(57) ABSTRACT

A combined pressure and temperature sensor comprising a tubular member 3 of circular cross section having a closed end and an open end, the open end, in use, connecting to a pressurized environment such that the interior of the tubular member is exposed to the pressure, a flat or preferably a symmetrical distribution of flats 1 being formed on the outer cylindrical surface of the tubular member 3, and a sensor element 2 mounted on at least one said flat 1, which sensor element 2 is sensitive to the strains in the tubular wall of the tubular member 3 resulting the pressure in the interior thereof and the temperature of said tubular member.

22 Claims, 3 Drawing Sheets

HIGH PRESSURE SENSOR

BACKGROUND OF THE INVENTION

1. Field of the Invention

The present invention relates to pressure sensors and more particularly to dead-ended tube type high pressure sensors.

2. The Prior Art

Prior art systems for industrial pressure and temperature sensing involve independent wired sensors, which require significant installation time and cost by trained technicians. Pipework or pressure vessels must be penetrated twice which increases disturbance and doubles risk of leaks or failures, cf. a combined sensor.

Traditional designs for pressure sensors have utilised diaphragms and, especially at higher pressures, dead-ended tubes of constant circular cross section, where the hoop stress which arises and varies in the dead-ended tube due to internal pressure is exploited. Sensing techniques include foil, thick and thin film, and piezo resistive, strain gauges, and capacitive techniques using micro-machined semi-conductor materials.

It is also known in the art to use SAW devices to form wireless SAW based combined pressure and temperature sensors. Such SAW based systems have the advantages that they are passive, so that power and signal transmission are both provided by RF means from the interrogation unit without the need for a dc voltage source (battery) in the sensor itself. They also have good accuracy for pressure measurement—typically 1-3% of Full Scale, and also for temperature measurement—typically +/−2 C over range −40 C to +125 C. They have low hysteresis and drift, long life with low maintenance requirement, are rugged—ability to withstand vibration and rough handling, are non-degrading in target environment, are capable of operating in hazardous environments—intrinsically safe, can be installed by non-specialist staff, and are cost competitive.

Known wireless SAW pressure and temperature sensors typically utilise a hermetic package enclosing a quartz beam mounted on two supports upon the top surface of which three SAW resonators are located. The lid of the package constitutes an elastic diaphragm which presses on the center of the quartz beam. Variation in ambient pressure causes the diaphragm to deflect thereby bending the quartz beam and causing the central SAW resonator, located between the supports, to vary its frequency. The other two resonators, located outside the supports, enable temperature to be independently measured and the pressure signal to be temperature compensated.

Such prior art systems are ideally suited for pressure measurement within the range 0 to around 20 bar. However, much higher pressures, e.g. >100 bar, require a different approach.

A known system suitable for measurement of such higher pressures comprises a dead-ended, thin walled, tubular pressure sensor of uniform cross section. Such a sensor carries its own end load (due to pressure), and experiences elastic tensile hoop and axial stresses in the well known ratio 2:1 (hoop:axial). The equivalent hoop:axial strain ratio, for an elastic isotropic material, is dependent on Poisson's ratio (v) and can be expressed $(2-v):(1-2v)$. For steel $v=0.3$, so the surface strain ratio is 1.7:0.4.

SUMMARY OF THE INVENTION

According to the present invention there is provided a pressure sensor comprising a tubular member having a closed end and an open end, the open end, in use, connecting to a pressurised environment such that the interior of the tubular member is exposed to the pressure, at least one flat formed on the otherwise circular outer cylindrical surface of the tubular member, a sensor element mounted on said at least on flat which is sensitive to the strain in the tubular wall of the tubular member, resulting from the pressure in the interior thereof.

A pressure sensor in accordance with the invention has the advantage that the flat(s) provide a surface for bonding a piezo-electric SAW substrate (2), e.g. crystalline quartz, and concentrate the hoop strain into discrete axial regions, whilst the axial strain is more or less uniformly distributed over the cross section. This increases the hoop:axial strain ratio and as a result enhances the sensitivity of the sensor, when locating the sensor element over one or more of the discrete axial regions.

Preferably a symmetrical distribution of at least two flats are formed on the otherwise circular outer cylindrical surface of the tubular member, eg two or three or four, are formed on the tubular member outer surface, a sensor element being mounted on at least one of said flats Most preferably four flats are formed on the tubular member in two opposing pairs oriented at 90 degrees to each other. A SAW based sensor is then preferably attached to at least one of the flats. Preferably the sensor element is sensitive both to strain and temperature so as to enable monitoring of both pressure and temperature. In particular, the sensor element is advantageously composed of at least three SAW resonators or delay lines, advantageously oriented with the principal axes at different inclinations. For deformation without bending, it is important that the distribution of the flats is symmetrical so that the overall cross-section remains symmetrical. For instance, if three flats are provided these should be at 120 degrees to each other. Furthermore, in the case of multiple flats, the flats should all be of equal width.

The flats are preferably machined on to the tubular member, but may be cast or formed when the tubular member is manufactured, if appropriate.

The flats preferably do not connect together—that is they do not form a square outer cross section but instead are either linked at either end to the neighbouring flats by curved portions of the outer wall of the tubular member or by inclined flats/chamfers which extend between proximate ends of the flats.

Preferably, the flats extend only partially along the tubular member but may also extend the entire length. A tubular lid member may advantageously be provided which engages over the closed end of the tubular member so as to overlie the flats.

The present invention further provides a corresponding method for forming a combined pressure and temperature SAW sensor.

BRIEF DESCRIPTION OF THE DRAWINGS

In order that the invention may be well understood, there will now be described an embodiment thereof, given by way of example, reference being made to the accompanying drawings, in which:

FIG. 2a is a cross-sectional view taken along the line B-B of FIG. 2b of a pressure sensor according to the invention;

FIG. 2b is a cross-sectional view taken along the line A-A of FIG. 2a;

FIG. 2c is right side elevational view of the pressure sensor of FIG. 2a; and

DETAILED DESCRIPTION OF THE PREFERRED EMBODIMENT

A resonant SAW sensor achieves its best performance when the measured parameter of choice is derived from a difference frequency, as this removes common mode error sources (e.g. resonant frequency pulling effect caused by a variable antenna impedance) by subtraction. The difference frequency signal proportional to "hoop minus axial, strain" as indicated above is ideal for constructing a high pressure sensor, by utilising a SAW die with resonators aligned with the axial and circumferential directions. A third resonator may be incorporated on the SAW die (as disclosed in applicants own earlier prior art reference GB patent application No. 0510326.2 whose disclosure is incorporated herein by reference) in order to sense temperature as an independent variable and as a means for temperature compensating the pressure signal.

Figure 1:
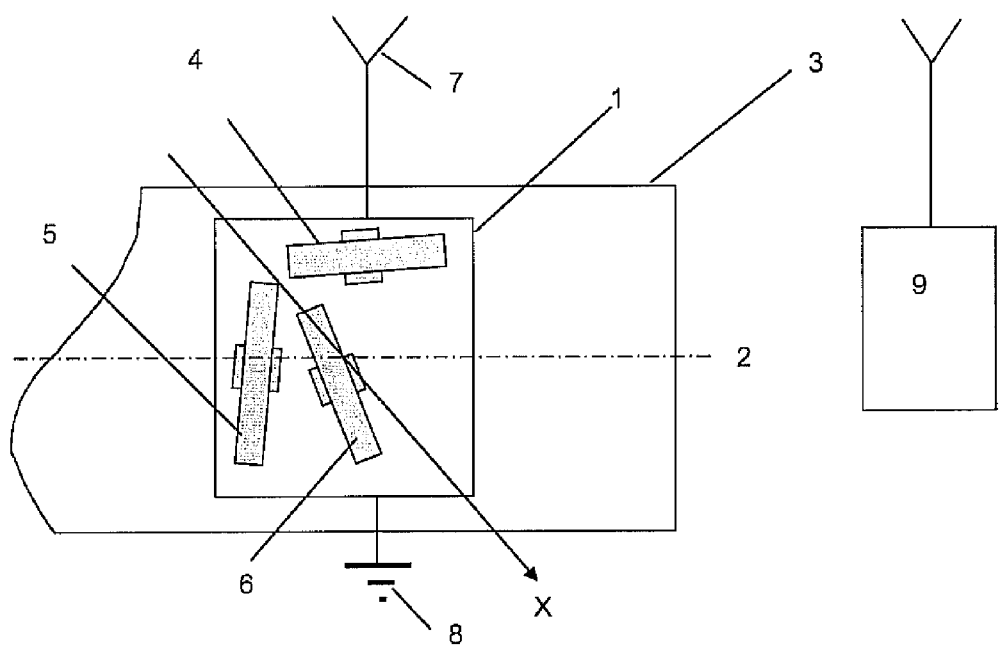
FIG. 1 is a diagrammatic illustration of a configuration of SAW sensors suitable for use as part of the present invention.

FIG. 1 shows a suitable orientation of the three SAW resonators fabricated on the surface of a single Y+34° cut quartz substrate 1 relative to the axis 2 of the tube 3. The crystallographic axis X of the quartz substrate 1 is positioned at 45° to the tube axis 2. Resonator P1SAW 4 with the resonant frequency $f_1$ is oriented in such a way that the SAW propagation direction in it is at 45° to the X axis and parallel to the tube axis 2. Resonator P2SAW 5 with the resonant frequency f) is oriented in such a way that the SAW propagation direction in it is at −45° to the X axis. Finally, Resonator TSAW 6 with the resonant frequency $f_3$ is oriented in such a way that the SAW propagation direction in it is at −30° to the X axis. All three resonators are electrically connected in parallel. One terminal is connected to the antenna 7 and another one is grounded (8). Electrical connection of the three resonators can also be series or combined (series and parallel). Antenna shown in FIG. 1 has an unbalanced input. If the antenna used in the sensor has a balanced input then the two terminals of the sensor are connected to the antenna terminals. The sensor can use a wide range of antennas depending on application, required radiation pattern and polarisation. In the simplest case it can be a monopole antenna attached to the sensor lid with ground plane provided by the surface of a pipe or a tank. It can also be a patch antenna attached to the dead end of the sensor tube. If the required read range is small (less than 0.5 m) a loop antenna or a spiral antenna with the diameter close to the diameter of the sensor itself can be used. In this case they can be integrated with the sensor lid.

This orientation of the resonators provides the sensitivities of the resonant frequencies to the hoop strain of approximately 2-2.5 kHz/microstrain for P1SAW, 0.54-0.65 kHz/microstrain for P2SAW, and 0.62-0.78 kHz/microstrain for TSAW. The nominal resonant frequencies of P1SAW, P2SAW and TSAW can be selected as follows: $f_1$=434.10 MHz, $f_2$=433.93 MHz and $f_3$=433.50 MHz. This selection ensures the measurable range of hoop strain from 0 to 130 microstrain at temperatures from −40° C. to +85° C. All three resonant frequencies remain within the European 433 MHz ISM band under any conditions and for realistic tolerances on the SAW manufacturing process, which allows license-free wireless interrogation of the sensor. Dynamic range of such a sensor is at least 40 dB.

The above recited orientation angles and resonant frequencies are, however, just examples of a possible implementation of the sensor. The range of preferred orientation angles is ±5° around the nominal values given above. It will also be understood that the SAW resonators can be replaced with the SAW reflective delay lines.

The sensor shown in FIG. 1 is wirelessly interrogated by the interrogation unit 9. In the case of a resonant SAW sensor, the aim of the interrogation unit is to measure the three resonant frequencies using, for instance, a pulsed interrogation method such as that disclosed in applicants own earlier prior art reference GB patent No. 2381074 whose disclosure is incorporated herein by reference, or an alternative interrogation technique performed in the frequency domain (see for instance applicants own earlier prior art reference WO 03/090353 whose disclosure is incorporated herein by reference). In the case of a reflective delay line sensor, the aim is to measure phase delays in the three delay lines using either pulsed interrogation, or interrogation in the frequency domain by means of a continuous wave (CW) signal with a variable frequency.

Unlike tube pressure sensors with conventional strain gauges, which because of their flexibility can be wrapped around the curved cylindrical surface and bonded to it, in the case of quartz (or other rigid piezo-electric substrates) it is not possible to adopt this approach. The present invention both overcomes this geometrical constraint and provides additional benefits in terms of the sensitivity.

Figures 2A, 2B, 2C:
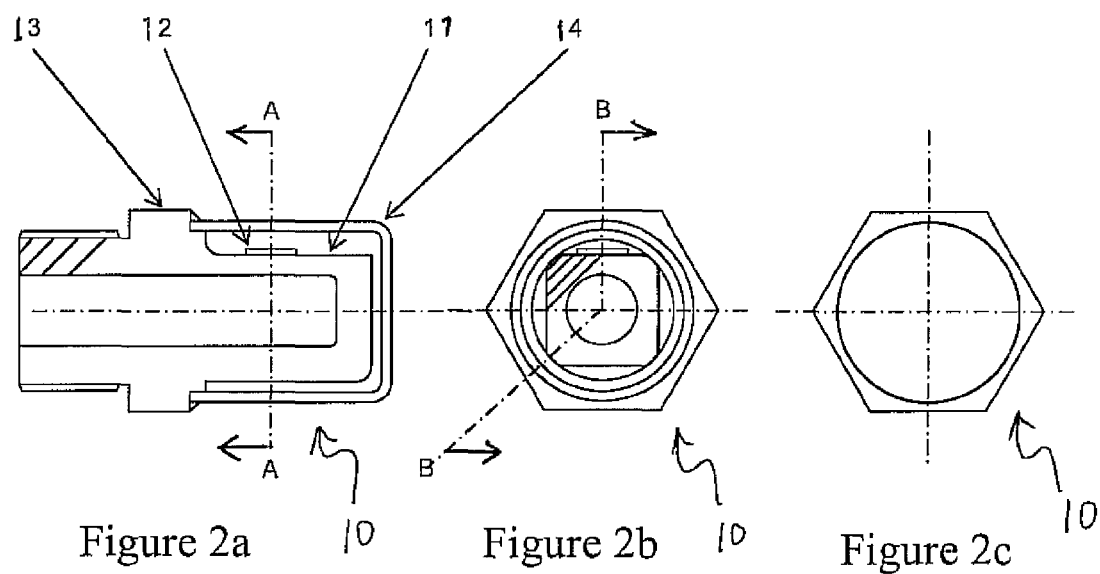
Figure 3:
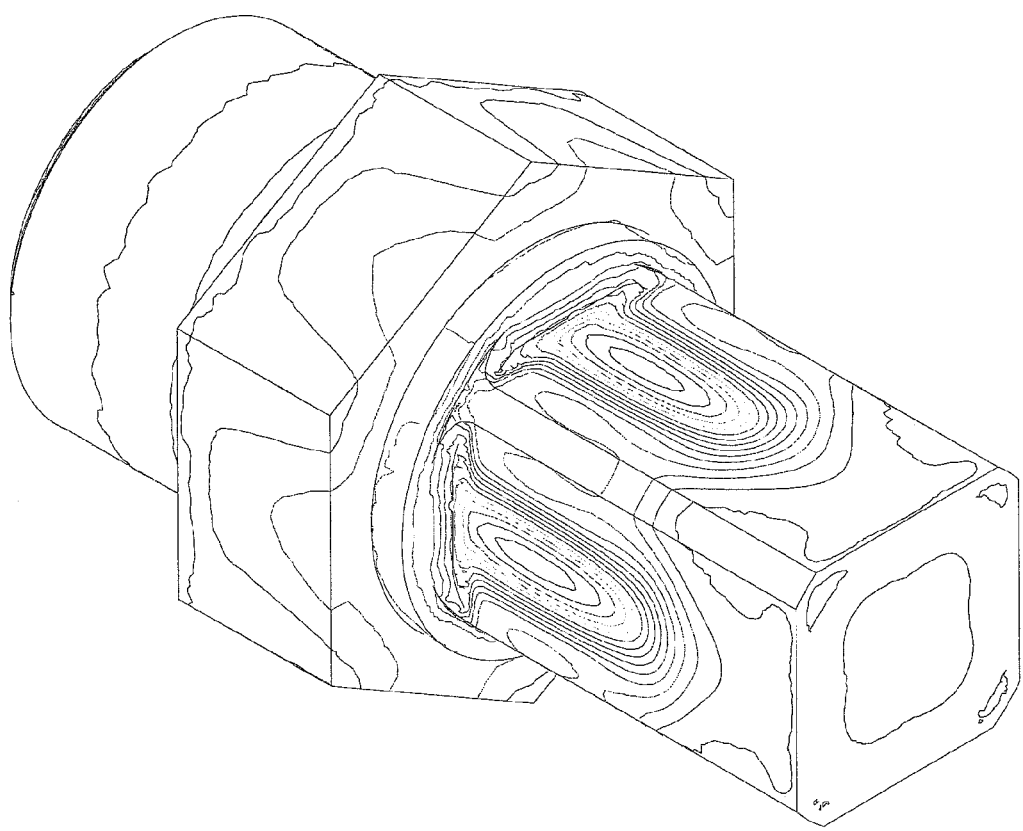
FIG. 3 is a finite element (strain) analysis of the pressure sensor of FIGS. 2a, 2b and 2c.

FIGS. 2a to 2c, show a dead-ended tube pressure sensor with a symmetrical distribution of four flats 11 introduced on the outside surface of the tube 10. These serve to provide a flat surface for bonding a piezo-electric SAW substrate 12, eg crystalline quartz. In addition they concentrate the hoop strain into four discrete axial regions, whereas the axial strain is more or less uniformly distributed over the cross section. This increases the hoop:axial strain ratio and enhances the sensitivity of the sensor, when locating SAW die over one or more of the discrete axial regions. A Finite Element Analysis—see FIG. 3—has confirmed this.

For the construction material of the sensor body 13, a martensitic stainless steel is recommended with 17/4PH a preferred choice since it combines excellent elastic and corrosion properties with good weldability. The material for the lid 14 is required to be compatible with the glass fritting process which provides a hermetic seal for the pins connecting the sensor to the antenna. Austenitic stainless steel is recommended with AISI 304L being preferred. This also enables the lid to be readily welded to the 17/4PH sensor body to form the complete assembly.

What is claimed is:

1. A pressure sensor comprising a tubular member made from martensitic stainless steel having a closed end and an open end, the open end, in use, connecting to a pressurized environment such that the interior of the tubular member is exposed to the pressure, at least one flat formed on the otherwise circular outer cylindrical surface of the tubular member, and a sensor element comprising a SAW based sensor having at least three SAW resonators or delay lines mounted on said at least one said flat, which sensor element is sensitive to the strains in the tubular wall of the tubular member so as to be responsive to changes in pressure in the interior of the tubular member.

2. The pressure sensor according to claim 1, wherein a symmetrical distribution of at least two flats is formed on the otherwise circular cylindrical outside surface of the tubular member, wherein one sensor element is mounted on at least one of said flats.

3. The pressure sensor according to claim 2, wherein four flats are formed on the tubular member in two opposing pairs oriented at 90 degrees to each other.

4. The pressure sensor according to claim 2, wherein said flats are of identical width, each flat forming a chord to the circular cross-section of the tubular member, wherein said chords do not intersect.

5. The pressure sensor according to claim 4, wherein neighbouring ends of the flats are linked by the curved outer surface of the tubular member.

6. The pressure sensor according to claim 4, wherein neighbouring ends of the flats are linked by one of inclined flats or chamfers which extend between proximate ends of the flats.

7. The pressure sensor according to claim 1, wherein the sensor element is sensitive to temperature so as to enable independent measurement of both pressure and temperature inside the tubular member and to provide means for a temperature compensated pressure signal.

8. The pressure sensor according to claim 1, wherein the at least three SAW resonators or delay lines have their principal axes inclined at different angles in order to sense both pressure and temperature.

9. The pressure sensor according to claim 8, wherein a first one of the SAW resonators or delay lines is oriented along an axis of the tubular member, a second one of the SAW resonators or delay lines is oriented essentially normal to the first one along the circumference of the tube and a third one of the SAW resonators or delay lines is at an angle 10° to 20° to the second one.

10. The pressure sensor according to claim 8, wherein all SAW resonators or delay lines are electrically connected together forming a one-port connected to an antenna for wireless interrogation of the sensor.

11. The pressure sensor according to claim 1, wherein the flats extend axially only partially along the tubular member.

12. The pressure sensor according to claim 1, further including a tubular lid member which engages over the closed end of the tubular member so as to overlie the flats.

13. The pressure sensor according to claim 12, wherein the lid is sealed to the tubular member.

14. The pressure sensor according to claim 12, wherein the lid is formed of an austenitic stainless steel, in particular AISI 304L.

15. The pressure sensor according to claim 1, wherein the tubular member is formed of 17/4 PH martensitic stainless steel.

16. The pressure sensor according to claim 1, wherein said at least one flat concentrates strain into axial regions thereby enhancing the sensitivity of said sensor.

17. A combined temperature and pressure sensor comprising:
 a tubular member made from martensitic stainless steel having a closed end and an open end, the open end, in use, connecting to a pressurised environment such that the interior of the tubular member is exposed to the pressure;
 at least one flat formed on the otherwise circular outer cylindrical surface of the tubular member; and
 a sensor element mounted on said at least one said flat, which sensor element is sensitive to the strains in the tubular wall of the tubular member so as to be responsive to changes in both the pressure and the temperature in the interior of the tubular member.

18. The pressure sensor according to claim 17, wherein said sensor element is a SAW based sensor comprised of at least three SAW resonators or delay lines.

19. The sensor according to claim 17, wherein said at least one flat concentrates strain into axial regions thereby enhancing the sensitivity of said sensor element.

20. A combined temperature and pressure sensor comprising:
 a tubular member made from martensitic stainless steel having a closed end and an open end, the open end, in use, connecting to a pressurised environment such that the interior of the tubular member is exposed to the pressure;
 at least two opposing flats symmetrically formed on the otherwise circular outer cylindrical surface of the tubular member; and
 a sensor element mounted on at least one of said flats, which sensor element is sensitive to the strains in the tubular wall of the tubular member resulting from changes in temperature and pressure within the tubular member on as to enable measurement of both the pressure and the temperature in the interior of the tubular member.

21. The sensor according to claim 20, wherein said sensor element is a SAW based sensor comprised of at least three SAW resonators or delay lines.

22. The pressure sensor according to claim 20, wherein said flats concentrate strain into axial regions thereby enhancing the sensitivity of said sensor elements.

* * * * *

UNITED STATES PATENT AND TRADEMARK OFFICE
CERTIFICATE OF CORRECTION

PATENT NO. : 8,141,428 B2  
APPLICATION NO. : 12/134365  
DATED : March 27, 2012  
INVENTOR(S) : Raymond D. Lohr and Victor A. Kalinin Page 1 of 1

It is certified that error appears in the above-identified patent and that said Letters Patent is hereby corrected as shown below:

Cover page, item (75), line 2, delete "Kallnin" and insert --Kalinin--;

Column 6, line 35, (Claim 20, line 15), following "member" delete "on" and insert --so--.

Signed and Sealed this
Twenty-sixth Day of June, 2012

David J. Kappos
*Director of the United States Patent and Trademark Office*